United States Patent
Chiang

(10) Patent No.: US 11,238,265 B1
(45) Date of Patent: Feb. 1, 2022

(54) ELECTRONIC DEVICE WITH FINGERPRINT SENSING FUNCTION AND FINGERPRINT SENSING MODULE

(71) Applicant: Novatek Microelectronics Corp., Hsinchu (TW)

(72) Inventor: Shao-Yang Chiang, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 17/017,688

(22) Filed: Sep. 11, 2020

(51) Int. Cl.
*G06K 9/00* (2006.01)

(52) U.S. Cl.
CPC .................. *G06K 9/0004* (2013.01)

(58) Field of Classification Search
CPC .................................................. G06K 9/0004
See application file for complete search history.

(56) References Cited

U.S. PATENT DOCUMENTS

| | | | | |
|---|---|---|---|---|
| 2015/0254495 A1* | 9/2015 | Rowe | ................. | G06K 9/00033 382/124 |
| 2020/0234026 A1* | 7/2020 | Du | .......................... | G06F 21/32 |
| 2020/0371408 A1* | 11/2020 | Iwaguchi | ............. | G02B 6/0045 |

\* cited by examiner

*Primary Examiner* — Joseph R Haley
(74) *Attorney, Agent, or Firm* — JCIPRNET

(57) ABSTRACT

An electronic device with fingerprint sensing function including a display panel, a fingerprint sensing module and a supporting frame are provided. The fingerprint sensing module includes a light source and an image sensor. The light source is configured to emit an illuminating light. The supporting frame is disposed between the display panel and the fingerprint sensing module for supporting the display panel. The supporting frame includes a first plane facing the display panel, a second plane facing the fingerprint sensing module, and an oblique through hole between the first plane and the second plane. The illuminating light is guided toward a sensing object above the display panel through the oblique through hole.

10 Claims, 4 Drawing Sheets

ELECTRONIC DEVICE WITH FINGERPRINT SENSING FUNCTION AND FINGERPRINT SENSING MODULE

BACKGROUND

Technical Field

The disclosure relates to a device, and particularly relates to an electronic device with fingerprint sensing function and a fingerprint sensing module.

Description of Related Art

An optical fingerprint sensing module of an electronic device may be disposed under a display panel of the electronic device, and light sources of the fingerprint sensing module may be configured to transmit an illuminating light through the display panel to incident into a sensing object (e.g. a finger) above the display panel, so that a diffused light generated inside the sensing object may return to an optical fingerprint sensor of the optical fingerprint sensing module. The size of the fingerprint sensing module in the electronic device, such as a mobile phone, cannot be reduced as wish because distance between each light source and another one light source of the fingerprint sensing module is required to be large enough to avoid a low-quality fingerprint image with over-exposure happening in the image boundary.

It should be noted that the contents of the section of "Description of Related Art" is used for facilitating the understanding of the disclosure. A part of the contents (or all of the contents) disclosed in the section of "Description of Related Art" may not pertain to the conventional technology known to the persons with ordinary skilled in the art. The contents disclosed in the section of "Description of Related Art" do not represent that the contents have been known to the persons with ordinary skilled in the art prior to the filing of this disclosure application.

SUMMARY

The disclosure is directed to an electronic device and a fingerprint sensing module capable of providing the fingerprint sensing function and equipped with a smaller size fingerprint sensing module.

The electronic device with optical sensing function of the disclosure includes a display panel, a fingerprint sensing module and a supporting frame. The fingerprint sensing module includes a light source configured to emit an illuminating light and an image sensor. The supporting frame is disposed between the display panel and the fingerprint sensing module for supporting the display panel. The supporting frame includes a first plane facing the display panel, a second plane facing the fingerprint sensing module, and an oblique through hole between the first plane and the second plane. The illuminating light is guided toward a sensing object above the display panel through the oblique through hole.

The fingerprint sensing module installed in an electronic device includes a substrate, a plurality of light sources, an image sensor, a lens and a lens holder. The electronic device includes a display panel and a supporting frame supporting the display panel. The supporting frame has a plurality of oblique through holes for light guiding. The plurality of light sources is disposed on the substrate. The image sensor is disposed on the substrate. The lens for concentrating lights is diffused by a sensing object positioned above the display panel. The lens holder is fixed on the substrate for supporting the lens. The fingerprint sensing module is installed below the supporting frame, and lights illuminating by the light sources are guided through the oblique through holes of the supporting frame and pass through the display panel to a sensing object.

Based on the above, the electronic device and the fingerprint sensing module of the disclosure can use a smaller size fingerprint sensing module where the light sources are allocated closer to each other. At the same time, in the first plane of the supporting frame facing the display panel, the opening area for the lens and the opening areas for the light sources may be separate by a distance large enough to prevent from image over-exposure.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

It is to be understood that other embodiments may be utilized and structural changes may be made without departing from the scope of the disclosure. Also, it is to be understood that the phraseology and terminology used herein are for the purpose of description and should not be regarded as limiting. The use of "including" "comprising" or "having" and variations thereof herein is meant to encompass the items listed thereafter and equivalents thereof as well as additional items. Unless limited otherwise, the terms "connected" "coupled" and "mounted" and variations thereof herein are used broadly and encompass direct and indirect connections, couplings, and mountings.

Figure 1:
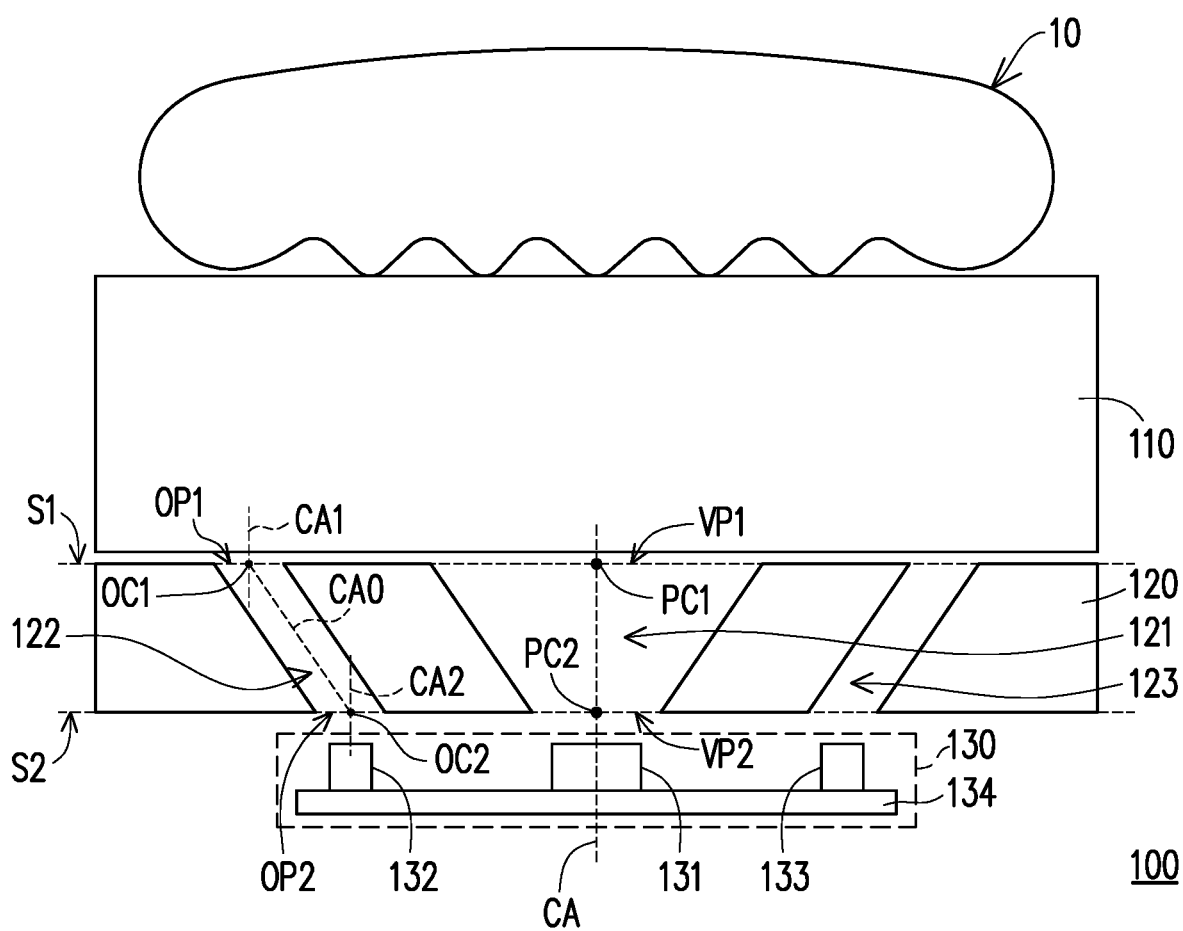
FIG. 1 is a sectional view diagram illustrating an electronic device according to an embodiment of the disclosure.

FIG. 1 is a sectional view diagram illustrating an electronic device according to an embodiment of the disclosure. Referring to FIG. 1, the electronic device 100 with fingerprint sensing function adopts an under-display optical fingerprint sensing architecture. The electronic device 100 includes a display panel 110, a supporting frame 120 (marked by slash lines) and a fingerprint sensing module 130. In the present embodiment, the fingerprint sensing module 130 includes an image sensor 131 and at least light sources 132, 133 which are shown in the sectional view diagram and a substrate 134, where the image sensor 131 and the light sources 132, 133 are disposed on the substrate 134. The fingerprint sensing module 130 also includes a lens (not shown in FIG. 1) position above the image sensor 131 and supported by a lens holder. The substrate 134 is parallel to a XY-plane. The light sources 132, 133 emit illuminating lights toward a Z-direction, and the image sensor 131 performs image sensing also toward the Z-direction. When a sensing object 10 such as a finger touches a sensing area of the display panel 110, the fingerprint sensing module 130 may capture an object image of the sensing object 10 by the image sensor 131.

In the present embodiment, the supporting frame 120 is disposed between the display panel 110 and the fingerprint sensing module 130, and configured to support the display panel 110 in the housing of the electronic device. The supporting frame 120 includes a first plane S1 facing the display panel 110, and a second plane S2 facing the fingerprint sensing module 130. The supporting frame 120 further includes a lens opening 121 and oblique through holes 122, 123 between the first plane S1 and the second plane S2. The lens opening 121 is an opening of the supporting frame 120 such that the image sensor 131 of the fingerprint sensing module 130 is able to receive diffused light or scattered light generated by the sensing object (e.g. finger) through the lens opening 121 and the lens of the fingerprint sensing module 130. In the present embodiment, surfaces of the lens opening 121 and the oblique through holes 122, 123 may be polished, so that the lens opening 121 and the oblique through holes 122, 123 may effectively transmit lights between the sensing object 10 and the fingerprint sensing module 130.

More specifically, in the present embodiment, the lens opening 121 includes a first opening area VP1 at the first plane S1, and a second opening area VP2 at the second plane S2. The center of the image sensor 131 is projected onto the first plane S1 and the second plane S2 along the Z-direction to form a first projection center PC1 and a second projection center PC2 respectively at the first plane S1 and the second plane S2, so that the center of the image sensor 131, the first projection center PC1 and the second projection center PC2 lie in the center axis CA of the image sensor 131. Moreover, the first projection center PC1 may also be a center of the first opening area VP1, and the second projection center PC2 may also be a center of the second opening area VP2. The first opening area VP1 may be larger than the second opening area VP2. In another embodiment, the projection centers PC1 and PC2 may denote the center of the lens rather than the image sensor.

In the present embodiment, each of the oblique through hole 122 and the oblique through hole 123 includes a first opening area OP1 at the first plane S1, and a second opening area OP2 at the second plane S2. A center OC1 of the first opening area OP1 and a center OC2 of the second opening area OP2 lies in different center axes CA1, CA2 along the Z-direction, and a center axis CA0 of the oblique through hole 122 is not orthogonal to the first plane S1 and the second plane S2 of the supporting frame 120. In the present embodiment, a size of the first opening area OP1 may equal to a size of the second opening area OP2, but the disclosure is not limited thereto. Moreover, it should be noted that, in the present embodiment, a first distance between the center OC1 of the first opening area OP1 of the oblique through hole 122 and the first projection center PC1 of the image sensor 132 at the first plane S1 is larger than a second distance between the center OC2 of the second opening area OP2 and the second projection center PC2 of the image sensor 132 at the second plane S2, but the disclosure is not limited thereto.

The number of light sources and the number of oblique through holes may be more than two. The light sources 132 and 133 may be disposed on positions that help the illuminating light of the light source transmit as much as possible through oblique through holes 122 and 123 the upward to reach the sensing object 10.

Figure 2:
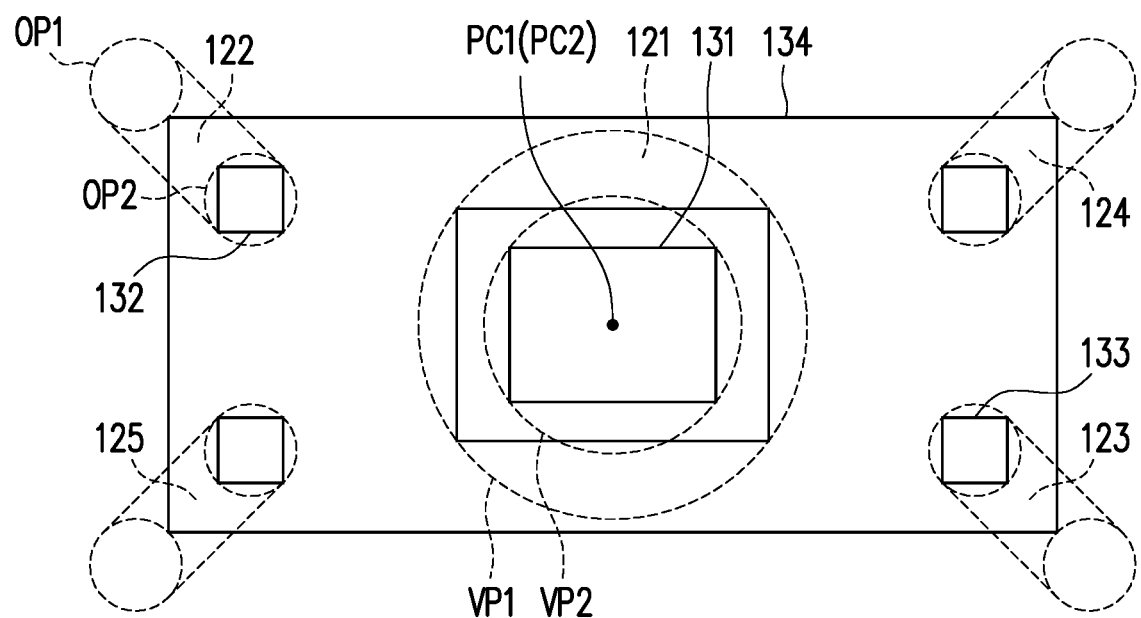
FIG. 2 is a top view diagram illustrating an electronic device according to an embodiment of the disclosure.
Figure 2:
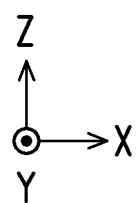

FIG. 2 is a top view diagram illustrating s fingerprint sensing module installed in the electronic device according to an embodiment of the disclosure. Referring to FIG. 1 and FIG. 2, FIG. 2 is one of embodiments of the fingerprint sensing module which may be installed in the electronic device of the FIG. 1. In FIG. 2, the relative positions of the lens opening 121 and fourth oblique through holes 122 to 125 of the supporting frame 120 are depicted by dashed line. The lens opening 121 may have a circular shape, and each of the oblique through holes 122 to 125 may have a circular shape, but the disclosure is not limited thereto. A rectangular outline drawn in solid line enclosing the image sensor 131 is a lens holder for supporting the lens (not shown) positioned above the image senor 131. The first opening areas (OP1) of oblique through holes 122 to 125 may be located on the first plane S1 of the supporting frame 120, and respectively near four corners of the lens opening 121. With respect to each oblique through hole, the first distance between the center OC1 of the first opening area OP1 of the oblique through hole 122 and the projection center PC1 of the image sensor 131 at the first plane S1 is larger than the second distance between the center OC2 of the oblique through hole 122 and the projection center PC2 of the image sensor 131 at the second plane S2. Moreover, the structures of the oblique through holes 123 to 125 may be referred to the above structure of the oblique through hole 122, and thus the description thereof will not be repeated. Further, the configurations of the oblique through holes 123 to 125 may be symmetrical by the lens opening 121 being a center, but the disclosure is also not limited thereto.

Benefit from the supporting frame 120 having oblique through holes for light guiding, the light sources disposed on the substrate 134 of the fingerprint sensing module 130 may be closer to the image sensor 131, referred to the second distance, and the first opening area OP1 of each oblique through hole can be still far enough (to avoid over-exposure) from the first opening area VP1 of the lens opening 121, referred to the first distance, to maintain the fingerprint image quality. As shown in FIG. 2, the size of the substrate 134 of the fingerprint sensing module 130 can contain the light sources and does not enclose the normal projections of the first opening areas OP1 of the oblique through holes, which means that a smaller fingerprint sensing module is realized.

Referring to FIG. 1 again, for example, the sensing object 10 may be a finger, and sensing object 10 may touch a sensing area of the display panel 110. When the fingerprint sensing module 130 performs the fingerprint sensing, the light sources 132, 133 respectively emit the illuminating lights, and the illuminating lights are guided by the oblique through holes and emit into the sensing object 10 through the display panel 110. The illuminating lights incident to the sensing object 10 may generate a plurality of diffused lights or scattered lights inside the sensing object 10. Then, at least a portion of the diffused lights or scattered lights pass through the display panel 110 to transmit to the image sensor 131 through the lens opening 121. Thus, the image sensor 131 may generate sensing signals based on the diffused lights received by the image sensor 131 from the sensing object 10 above the display panel 110. An image readout IC of the fingerprint sensing module may generate digital image data corresponding to the sensing signals, and a processor of the electronic device may generate a fingerprint image according to the digital image data from the image readout IC and perform fingerprint recognition.

In the present embodiment, the display panel 110 may be, for example, a self-illuminating panel or a thin film transistor liquid crystal display (TFT-LCD) panel, and self-illuminating panel may be an organic light emitting diode (OLED) display panel. The fingerprint sensing module 130 is an optical fingerprint sensing module, and the image sensor 131 may be a complementary metal-oxide-semiconductor (CMOS) image sensor. Moreover, the light sources 132, 133 may be infrared light sources configured to emit infrared lights which may be used if the display panel 110 is an LCD panel; and the light sources 132, 133 may be emit visible light having a wavelength in a specific range if the display panel 110 is an OLED panel, and in such as case the light sources 132, 133 are used as auxiliary light sources. But the disclosure does not limit the type of the image sensor 131 and the light sources 132, 133.

Figure 3:
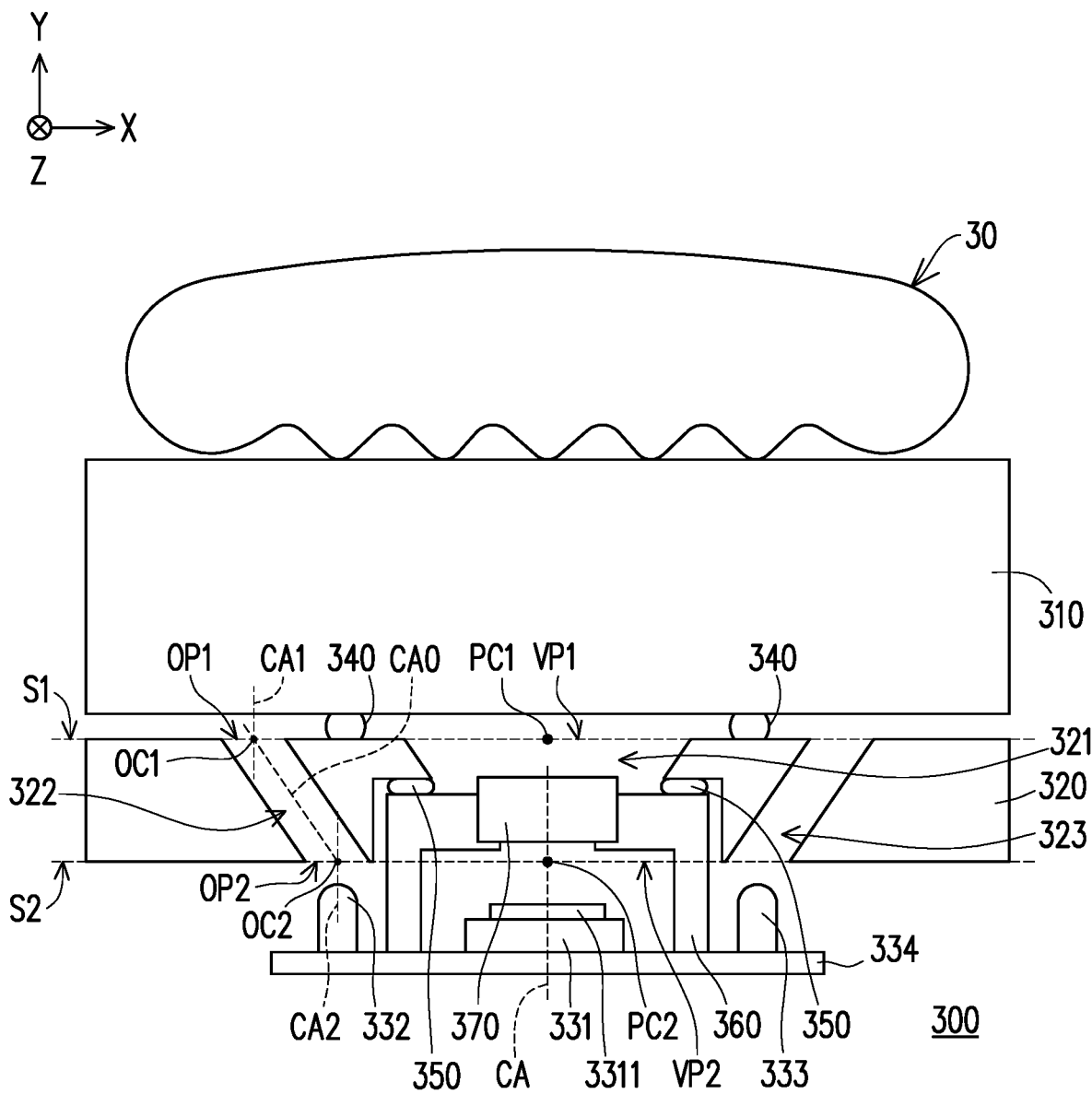
FIG. 3 is a sectional view diagram illustrating an electronic device having a self-illuminating panel according to an embodiment of the disclosure.

FIG. 3 is a sectional view diagram illustrating an electronic device having a self-illuminating panel according to an embodiment of the disclosure. Referring to FIG. 3, the electronic device 300 with fingerprint sensing function adopts an under-display optical fingerprint sensing architecture. The electronic device 300 includes a display panel 310, a supporting frame 320, a fingerprint sensing module, a light blocking element 340, a gasket 350, a lens holder 360 and a lens 370. In the present embodiment, the display panel 310 may be a self-illuminating panel without backlight, such as an OLED display panel. The illuminating lights can pass the display panel 310 to the sensing object 30, and the diffused lights or scattered lights from the sensing object 30 can pass the display panel 310 to an image sensor of the fingerprint sensing module.

In the present embodiment, the fingerprint sensing module includes an image sensor 331, a filter 3311, the light sources 332, 333, a substrate 334, a lens holder 360 and lens 370, where the filter 3311 is disposed on the image sensor 331. The filter 3311 is configured to pass only lights in a specific range of light spectrum, for example, only pass the visible lights having wavelength in the specific range. The substrate 334 is parallel to a XY-plane. The light sources 332, 333 emit the illuminating lights toward Z-direction. The image sensor 331, the light sources 332, 333 and the lens holder 360 are disposed on the substrate 334, and the lens holder 360 is disposed around the image sensor 331 to support the lens 370. In the present embodiment, the lens holder 360 may be a non-transparent material, so as to optically isolate the image sensor 331 from light sources 332, 333. In the present embodiment, the lens 370 may be a convex lens, and configured to concentrate the diffused lights from the sensing object 30 to the image sensor 331. In another embodiment, the lens may be composed of multiple lens providing different optical effects.

In the present embodiment, the light blocking element 340 is disposed between the display panel 310 and the supporting frame 320, and the light blocking element 340 supports the display panel 310. The light blocking element 340 is configured to optically isolate the diffused/scattered light from the sensing object to be received by the image sensor 331 from the illuminating light generated by the light sources 332, 333. In the present embodiment, the gasket 350 is disposed between the supporting frame 320 and the holder 360 to fix the fingerprint sensing module to the supporting frame 320. Moreover, in the present embodiment, the supporting frame 320 may form a groove space as shown in FIG. 3 for accommodating a portion of the lens holder 360, but the disclosure is not limited thereto.

In the present embodiment, the supporting frame 320 includes a first plane S1 facing the display panel 310, and a second plane S2 facing the fingerprint sensing module. The supporting frame 320 further includes a lens opening 321 and at least oblique through holes 322, 323 shown in the sectional view diagram between the first plane S1 and the second plane S2. In the present embodiment, the lens opening 321 includes a first opening area VP1 at the first plane S1, and a second opening area VP2 at the second plane S2. The lens opening 321 is similar to the lens opening 121 of FIG. 1 and may be referred to the description as above.

In the present embodiment, the oblique through hole 322 includes a first opening area OP1 at the first plane S1, and a second opening area OP2 at the second plane S2. The oblique through hole 322 is similar to the oblique through hole 122 of FIG. 1 and may be referred to the description as above. Benefit from the supporting frame 320 having oblique through holes for light guiding, the light sources disposed on the substrate 334 of the fingerprint sensing module of FIG. 3 may be closer to the image sensor 331 and the lens 370, and the first opening area OP1 of each oblique through hole can be still far enough (to avoid over-exposure) from the first opening area VP1 of the lens opening 321 to maintain the fingerprint image quality. Besides, the size of the substrate 334 of the fingerprint sensing module does not enclose the normal projections of the first opening area OP1 of the oblique through holes, which means that a smaller fingerprint sensing module is realized.

However, enough teaching, suggestion, and implementation regarding related device features, implementation methods and technical details of the electronic device 300 with fingerprint sensing function of this embodiment may be obtained with reference to the foregoing embodiments of FIG. 1 to FIG. 2, which are not repeated hereinafter.

Figure 4:
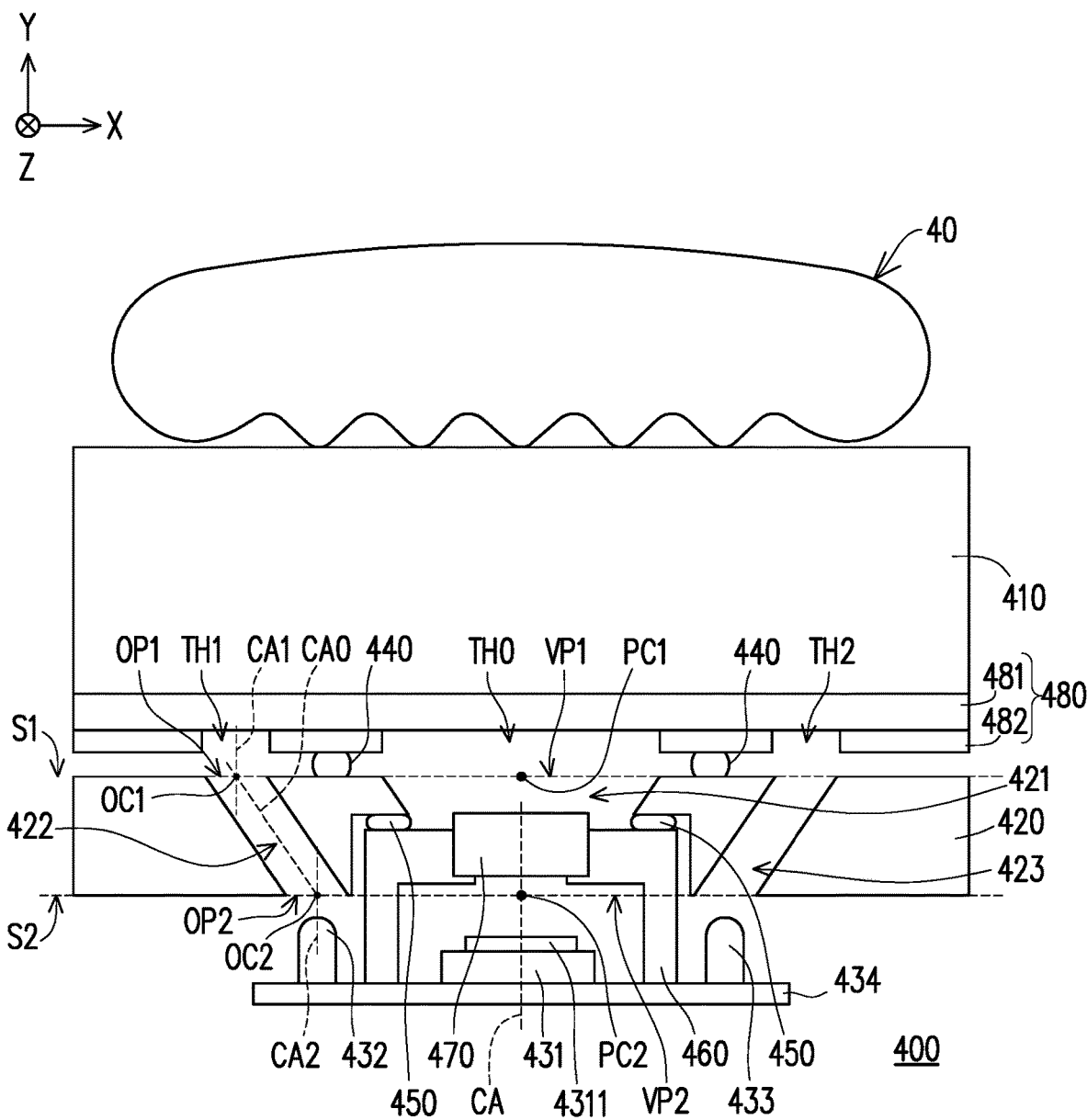
FIG. 4 is a sectional view diagram illustrating an electronic device having a TFT-LCD panel according to an embodiment of the disclosure.

FIG. 4 is a sectional view diagram illustrating an electronic device having a TFT-LCD panel according to an embodiment of the disclosure. Referring to FIG. 4, the electronic device 400 with fingerprint sensing function adopts an under-display optical fingerprint sensing architecture. The electronic device 400 includes a display panel 410, a supporting frame 420, a fingerprint sensing module, a light blocking element 440, a gasket 450, a lens holder 460, a lens 470 and a backlight module 480. In the present embodiment, the display panel 410 may be the TFT-LCD panel, and the backlight module 480 is disposed under the display panel 410, where the display panel 410 and the backlight module 480 may be mounted together. In other words, the backlight module 480 is disposed between the display panel 410 and the supporting frame 420. In an example, the backlight module 480 includes a light source (not shown), a backlight layer 481 which may be a multilayer including a prism sheet, a light guide plate, at least one diffuser sheet, a reflection sheet, etc., and a back cover 482 which may be made by matel material. The backlight layer 481 is disposed on the back cover 482, and the back cover 482 includes opening TH0, TH1 and TH2. The opening TH0 is located above and corresponds to a lens opening 421 of the supporting frame 420. The openings TH1, TH2 are respectively located above and corresponds to oblique through holes 422, 423 of the supporting frame 420 to face the oblique through holes 422, 423. Thus, the illuminating lights provided by the fingerprint sensing module are guided toward the openings TH1, TH2 through the oblique through holes 422, 423, and the illuminating lights further guided toward the sensing object 40 above the display panel 410 through the backlight layer 481. In the present embodiment, the display panel 410 can pass the illuminating lights to the sensing object 40, and pass the diffused/scattered lights from the sensing object 40 caused by the illuminating lights to the fingerprint sensing module though the backlight layer 481, the opening TH0 of the back cover 482, and the lens opening 421 of the supporting frame 420.

In the present embodiment, the fingerprint sensing module includes an image sensor 431, a filter 4311, light sources 432, 433, a substrate 434, a lens holder 460 and lens 470, where the filter 4311 is disposed on the image sensor 431. The filter 4311 is configured to, for example, only pass the diffused lights (i.e. infrared lights) from the sensing object 40. The substrate 434 is parallel to a plane extending from the X-direction and the Y-direction. The light sources 432, 433 emit the illuminating lights toward the Z-direction, and the image sensor 431 performs image sensing also toward the Z-direction. The image sensor 431, the light sources 432, 433 and the lens holder 460 are disposed on the substrate 434, and the lens holder 460 is disposed around the image sensor 431. The lens holder 460 may be a non-transparent material, so as to optically isolate the image sensor 431 from light sources 432, 433. The lens holder 460 is configured to hold the lens 470, so that the lens 470 may fixedly disposed above the image sensor 431. In the present embodiment, the lens 470 may be a convex lens, and configured to collect the diffused lights from the sensing object 40 to the image sensor 431.

In the present embodiment, the light blocking element 440 is disposed between the back cover 482 and the supporting frame 420, and the light blocking element 440 is configured to optically isolate the diffused/scattered light from the sensing object to be received by the image sensor 431 from the illuminating light generated by the light sources 432, 433. In the present embodiment, the gasket 450 is disposed between the supporting frame 420 and the lens holder 460 to fix the fingerprint sensing module to the supporting frame 420. Moreover, in the present embodiment, the supporting frame 420 may form a groove shape as shown in FIG. 4 for accommodating a portion of the lens holder 460, but the disclosure is not limited thereto.

More specifically, when the fingerprint sensing module performs the fingerprint sensing, the light sources 432, 433 respectively emit the illuminating lights into the oblique through hole 422, 423, so that the illuminating lights are respectively guided toward the openings TH1, TH2 of the back cover 482 by the oblique through hole 422, 423. Then, the illuminating lights pass though the openings TH1, TH2, and the illuminating lights are further guided to pass though the backlight layer 481 and the display panel 410 toward the sensing object 40, thereby correspondingly generating a plurality of diffused/scattered lights inside the sensing object 40. Further, at least a portion of the diffused lights may pass through the display panel 410 and the backlight layer 481, and pass through the opening TH0 of the back cover 482 and the lens opening 421 of the supporting frame 420 to the lens 470. The lens 470 concentrates the diffused lights to further transmit the diffused lights to the image sensor 431. Thus, the image sensor 431 may generate sensing signals based on the diffused lights received by the image sensor 431 from the sensing object 40 above the display panel 410, where the sensing signals may be used for generating a fingerprint image.

In the present embodiment, the lens opening 421 and the oblique through holes 422 and 423 are similar to the lens opening 121 or 321 and the oblique through holes 122 and 123, or 322 and 323, which can be referred to the same components illustrated in FIG. 1 to FIG. 3 and related descriptions. Benefit from the supporting frame 420 having oblique through holes for light guiding, the light sources disposed on the substrate 434 of the fingerprint sensing module of FIG. 4 may be closer to the image sensor 431 and the lens 470, and the first opening area OP1 of each oblique through hole can be still far enough (to avoid over-exposure) from the first opening area VP1 of the lens opening 421 to maintain the fingerprint image quality. Besides, the size of the substrate 334 of the fingerprint sensing module does not enclose the normal projections of the first opening area OP1 of the oblique through holes, which means that a smaller fingerprint sensing module is realized.

In summary, the electronic device and the fingerprint sensing module of the disclosure adopting an under-display optical fingerprint sensing architecture can effectively provide an effective the fingerprint sensing function. The electronic device of the disclosure can use a smaller size fingerprint sensing module where the light sources are allocated closer to each other. At the same time, in the first plane of the supporting frame facing the display panel, the opening area for the lens and the opening areas for the light sources may be separate by a distance large enough to prevent from image over-exposure.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic device with fingerprint sensing function comprising:
   a display panel;
   a fingerprint sensing module, comprising a light source configured to emit an illuminating light and an image sensor; and
   a supporting frame, disposed between the display panel and the fingerprint sensing module for supporting the display panel, and comprising a first plane facing the display panel, a second plane facing the fingerprint sensing module, and an oblique through hole between the first plane and the second plane, and
   wherein the illuminating light is guided toward a sensing object above the display panel through the oblique through hole,
   wherein the oblique through hole comprises a first opening area at the first plane and a second opening area at the second plane, and a first distance between a center of the first opening area and a first projection center of the image sensor at the first plane is larger than a second distance between a center of the second opening area and a second projection center of the image sensor at the second plane.

2. The electronic device according to the claim 1, wherein a center axis of the oblique through hole is not orthogonal to the first plane of the supporting frame.

3. The electronic device according to the claim 1, wherein the center of the first opening area and the center of the second opening area lies in different center axes.

4. The electronic device according to the claim 3, wherein a size of the first opening area is equal to a size of the second opening area.

5. The electronic device according to claim 1, wherein the image sensor is configured to generate a sensing signal based on diffused lights received by the image sensor from the sensing object above the display panel.

6. The electronic device according to the claim 1, wherein the fingerprint sensing module further comprises a substrate, a lens holder and a lens and the lens holder, the light source and the image sensor are disposed on the substrate, wherein the lens holder is disposed between the light source and the image sensor and configured to hold the lens above the image sensor.

7. The electronic device according to the claim 1, wherein the display panel is a self-illuminating panel.

8. The electronic device according to the claim 1, further comprising:
a backlight module, disposed between the display panel and the supporting frame, comprising a backlight layer and a back cover, wherein the backlight layer is disposed on the back cover, and the back cover comprises a first opening located above the oblique through hole, and the illuminating light is guided toward the sensing object above the display panel through the first opening.

9. A fingerprint sensing module installed in an electronic device, wherein the electronic device comprising a display panel and a supporting frame supporting the display panel, the supporting frame having a plurality of oblique through holes for light guiding, and the fingerprint sensing module comprising:
a substrate;
a plurality of light sources disposed on the substrate;
an image sensor disposed on the substrate;
a lens for concentrating lights diffused by a sensing object positioned above the display panel; and
a lens holder fixed on the substrate, for supporting the lens;
wherein the fingerprint sensing module is installed below the supporting frame, and lights illuminating by the light sources are guided through the oblique through holes of the supporting frame and pass through the display panel to a sensing object,
wherein each of the oblique through holes comprises a first opening area exposed to a first plane of the supporting frame facing to the display panel and a second opening area exposed to a second plane of the supporting frame facing to the fingerprint sensing module, and a first distance between a center of the first opening area and a first projection center of the image sensor at the first plane is larger than a second distance between a center of the second opening area and a second projection center of the image sensor at the second plane.

10. The fingerprint sensing module according to the claim 9, wherein the size of the substrate of the fingerprint sensing module does not enclose a normal projection of the first opening area of each of the oblique through holes in a first surface of the supporting frame.

* * * * *